Aug. 21, 1962  HANS-JOACHIM DENECKE  3,049,962
METHOD AND APPARATUS FOR ELIMINATING THE DAZZLING EFFECT
OF STRONG SOURCES OF LIGHT, PARTICULARLY
FOR AUTOMOTIVE VEHICLES

Filed Oct. 1, 1956  2 Sheets-Sheet 1

INVENTOR
HANS-JOACHIM DENECKE

BY Burgess, Dinklage & Sprung
ATTORNEYS

Aug. 21, 1962 HANS-JOACHIM DENECKE 3,049,962
METHOD AND APPARATUS FOR ELIMINATING THE DAZZLING EFFECT
OF STRONG SOURCES OF LIGHT, PARTICULARLY
FOR AUTOMOTIVE VEHICLES
Filed Oct. 1, 1956 2 Sheets-Sheet 2

INVENTOR
HANS-JOACHIM DENECKE

BY Burgess, Dinklage & Sprung
ATTORNEYS

United States Patent Office 3,049,962
Patented Aug. 21, 1962

3,049,962
METHOD AND APPARATUS FOR ELIMINATING THE DAZZLING EFFECT OF STRONG SOURCES OF LIGHT, PARTICULARLY FOR AUTOMOTIVE VEHICLES
Hans-Joachim Denecke, Heidelberg, Germany, assignor to Baulio Etablissement, Vaduz, Liechtenstein, a corporation of Liechtenstein
Filed Oct. 1, 1956, Ser. No. 613,078
Claims priority, application Germany Oct. 3, 1955
33 Claims. (Cl. 88—1)

The present invention relates to and has as its object a method and apparatus for eliminating the dazzling effect of strong sources of light, particularly in connection with vehicles.

In accordance with the invention, intermittent light flashes of high frequency alternately varying in intensity are produced. This type of light, without impairing the view or the necessary lighting and illuminating of the field of view in front of the source of light, avoids any dazzling effect, so that use thereof in vehicle operation, for example, eliminates dazzling while being entirely independent of whether or not a car coming from the opposite direction is provided with such a device. Devices utilizing the intermittent light flashes may be used for all purposes in which a long-beam light produces a dazzling effect, either in the cases of stationary sources of light or lights used on vehicles.

The invention is based on findings which result from the physiology of the sensory organs, and particularly the physiological peculiarities of the retina of the eye. When a sensory organ is excited, an absolute refractory phase followed immediately by a relative refractory phase occur directly after the stimulus is given. One accordingly distinguishes between an absolute and a relative refractory time; in the former the nerve is non-excitable, while in the second the excitability of the nerve increases again to the normal value within a given period of time. The absolute refractory phase is therefore that of the non-excitability, while the relative refractory phase is that of the decreasing hypoexcitability. If, for instance, a light stimulus falls within the relative refractory phase, then it will be perceived substantially weaker than it actually is, and, as a matter of fact, the weaker, the closer it falls in point of time to the absolute or unresponsive time range of the retina. All these considerations apply to the person looking at the source of light. On the other hand, this light stimulus is perceived in full intensity by an eye looking in the directon of the projection of the light, on which eye no refractory phase was produced. The time period of the absolute refractory phase is very short, being less than $\frac{1}{1000}$ of a second, while the time interval of the relative refractory phase is considerably longer than that of the absolute refractory phase, since it is about $\frac{1}{50}$ of a second and less.

The invention is based on these physiological features. It arises from recognition of the fact that the basic problem on which the invention is based can be solved with devices for producing an intermittent light of high frequency in connection with which one proceeds in such a manner that in a continuously recurring sequence a phase of dim light follows a dark phase the phase of dim light in turn being followed by a phase of bright, possibly dazzling light, in which connection the time interval between the phases of dim and bright or dazzling light is less than the length of time of the refractory phases of the eye. In this case, the dim light produces a refractory phase in the eye, within which phase the bright or dazzling light falls, and accordingly is not felt as a bright or dazzling light. The arrangement is preferably such that the duration of the bright light is also less than that of the time of the refractory phase. In such case, the bright light falls within the absolute refractory phase produced by the dim light and thus within the phase of the complete non-responsivity of the optic nerve. If, furthermore, a more or less strongly increasing transition is provided between the phase of dim light and the phase of bright or dazzling light, this contributes towards making the increase of the intensity from the dim to the bright light felt less strongly than if the transition is effected suddenly. In order to obtain light with the desired phase sequence, one can proceed in two different manners. Thus, this light can be obtained by devices of a subtractive action which first of all interrupt for short periods of time a bright or dazzling light in a constantly recurring sequence, thereupon make it dim again for a short time, and thereupon again allow it to act with its full brightness. However, such a light can also be obtained in the manner that a continuously recurring sequence of dark, dim, and bright, or dazzling phases is obtained additively by the corresponding sequence of a dim light flash, and thereupon a bright light flash on a dark phase. Devices which operate additively in this manner avoid any loss of energy in contradistinction to subtractively operating devices. In order to obtain a brief interruption and brief dimming of the bright or dazzling light in the case of a device acting by subtraction or in order to obtain the constantly recurring sequence of a dark, dim, and bright or dazzling phase by a corresponding succession of a dim and thereupon bright light flash on a dark phase in the case of additively operating apparatus, and thus a light which is intermittent in the required manner, a known electromagnetic control device can be employed. In the case of an additive device, the successive dim and bright light flashes can come from a single, suitably controlled source of light or from two different sources of light which are suitably connected and controlled. Flicker lights of a type known per se can be used for the emitting of the light flashes.

Both in the case of devices which operate by a subtractive process and in the case of devices which operate additively, an additional illuminating system can further be provided which is automatically connected upon the stopping or failure of the device.

The light sent out by the headlight or headlights of the device can have admixed to it in the manner known per se a spectral color of shorter wave length than that of red light (for instance, blue). In spectral colors, the colors of shorter wave lengths (for instance, blue) for the same intensity of light have a stronger action on the retina and thus on the light perception than the longer wave lengths (for instance, red). Since, furthermore, the brightness values of the spectrum are shifted for twilight vision towards short waves as compared with daylight vision, it is advisable to use a shorter wave light for the illuminating of the road. In order, however, to remove a part of the dazzling effect from a bright blue light, it is advantageous to admix to the preceding dim stimulus a long-wave spectral color (for instance, red), since in the case of red light, the action current at the retina immediately flows in positive direction and reaction current, for instance, for blue, in negative direction. The single phase curve resulting from these two light projections after the termination of the absolute refractory time exhibits a reduction in the stimulus.

In order to obtain the best possible effect, that is a flicker-free illuminating of the road, the change in phase should be effected so rapidly that it lies above the fusion limit of the different light beams, and, furthermore, in the case of increasing speed of the vehicle, a continuous lighting of the road also is obtained. For this reason, the change in phase either in the case of light flashes or in the case of a mechanical device by means of moving parts should be more than 700 per minute. In order, in the case of a rotating mechanical device, to have the dazzling light beam follow the dim stimulus as closely as possible, there is required a higher number of revolutions per minute, which is preferably within the range of the physiological optimum value, namely about 7,000–10,000 per minute.

The applicant has now discovered a method of eliminating the dazzling effect of strong sources of light, particularly in connection with vehicles, characterized by means for producing an intermittent light of high frequency which causes a phase of dim light to follow a dark phase and a phase of bright, possibly dazzling light to follow the dim phase in a continuously recurring sequence, the time elapsed between the beginning of the phases of dim and the end of the phase of bright or dazzling light being less than the duration of the refractory phases of the eye.

For the more intensive illuminating of one side of the road, the headlight can have its direct beam of light directed laterally asymmetrically on the road in a manner known per se.

By the provision of an improved glass lens, that is a glass lens provided with a suitable coating located in front of the device, the reflection is reduced and the passage of the light is promoted so that a brighter illuminating of the road is obtained in a manner known per se.

In connection with all devices serving to produce an intermittent light in accordance with the invention, the arrangement may also be such that it serves both for eliminating the dazzling effect of the car's own headlight and also serves within the car's own field of view for the bedazzling of headlights coming from the opposite direction.

In one special development of the arrangement in accordance with the invention, the device arranged in the field of view of the driver can be adjustable as a whole with respect to the direction of view. This makes possible a better adaptation to the specific conditions. Furthermore, it may be advisable to impart to the device arranged in the field of view of the driver a curved surface.

A subtractively acting device for producing the light with the desired properties in accordance with the invention is characterized by the use of a plurality of rapidly rotating or only partly rotating bands arranged in front of the headlight or headlights, and possibly also in the driver's own field of view, which bands are reflective in the region of the headlight or headlights. The anti-dazzling effect of such a device results from the previously stated physiological facts. Upon the rotation of the bands, no light passes through when they are in their cross position; after they have been turned further by 45° as a result of the reflection of the light by the reflecting bands, there is produced an illuminating of the bands without the light directly passing through, as a result of which the source of light appears dim. This results in a stimulus of the retina of an eye looking at the source of light; after the bands have thereupon turned further, there follows the direct transmission of light with its full intensity, and possibly, therefore, of a dazzling light. If the time interval between the stimulus by the dim light and the passage of the direct light (dazzling action) is very short, the latter will not be experienced as being dazzling, as a result of the above-described special nature of the physiology of the sensory organs, and, in particular here of the retina of the eye. Due to the short duration of the absolute refractory phase ($\frac{1}{1000}$ second) it is difficult by purely mechanical means to cause the dazzling stimulus to fall within the absolute refractory phase produced by the first dim stimulus; on the other hand, one can cause this dazzling stimulus depending on the speed of rotation of the bands to fall laterally within the relative refractory phase of the dim stimulus, the duration of which, as already stated, is considerably longer than that of the absolute refractory phase ($\frac{1}{50}$ of a second and less). If this dazzling stimulus can still have a dazzling effect, it can be considerably further reduced in accordance with the $t \times \log I =$ constant by shortening the time offered, which is equivalent to a moving forward into the more unexcitable part of the refractory phase or is equivalent to an increase of the speed of revolution of the bands. In this formula, $t$ is the time, and $I$ the light intensity.

The opening and closing phases (i.e. duration) of the rotating bands must change so rapidly that a continuous picture is obtained as a result of the physiology of the retina of the eye; in this connection, the opening phase should at the same time be as small as possible as compared with the closing phase, in order to exclude the dazzling effect by the car's own head light(s). There is then produced for the eye the picture of a continuous illuminating of the region located directly in front of the car's own headlight or headlights with simultaneous elimination of the dazzling effect of headlights of oncoming cars when the bands are also arranged in the driver's own field of view.

In order to fulfill these requirements, the mechanical device operating with rotating bands can be developed in various manners and provided with further technical means. These different possibilities of development and design are described below.

Bands rotating about their central longitudinal axis are preferably vertical to the road. This vertical position is probably the most favorable, although other positions of the bands are possible, for distance, in the manner that bands standing vertically in a row are combined with rows of horizontal or oblique bands. The bands are arranged in a row alongside of each other and lie in this connection in a plane so that their longitudinal edges have as little play as possible with respect to each other. The bands in one plane can also have their longitudinal edges overlap each other slightly, this being more advantageous. Furthermore, bands lying in a plane can be spaced from each other and have the distances between them covered by other bands staggered with respect to them, and arranged as close to them as possible also lying in one plane. There can furthermore also be provided more than two rows of bands, which can also be arranged behind each other in one plane with gaps. The bands in this connection take up the full width of the headlight or headlights. The number of bands to be used depends on their width. If the bands are narrow, a larger number of bands are required to cover the necessary width of the headlight. The bands can all turn in one direction, or else in opposite directions, depending on their arrangement. Furthermore, it is possible to have the bands carry out a backward and forward swinging motion. However, it is necessary for all bands or given groups of bands to be parallel to the direction of travel at the same moment. Depending on the arrangement of the bands, the opening phase, that is the phase through which direct light, i.e., not light which has been reflected by the bands, passes directly through the rows of bands onto the road, may be particularly small as compared with the closing phase, that is the phase in which no reflected light from the headlight or source of light falls directly on the road. In this consideration, the position of the bands in which only reflected light emerges is not taken into account.

As a special further development of the device with rotating bands, in case of the arrangement of several rows of bands behind each other and the arrangement of a part of the bands parallel to the direction of travel, the other bands are at the same time turned with respect to the former.

In this way, the result is obtained that less time is available for the direct emergence of light, since the opening phase can be still further shortened in this manner, for instance, in case of the arrangement of three rows of bands behind each other. This becomes of importance when the speed of rotation of the bands cannot be increased to such an extent that the dazzle stimulus falls far enough within the refractory phase of the dim stimulus. Since the light stimulus has a weaker action in the refractory phase, as a result of this arrangement of the bands the dazzling effect is considerably further reduced, since the bleaching of the visual purple which follows the light sensitivity linearly is dependent on the time $t$ and on the light intensity I in the maner that $t \times \log I$=constant. If, therefore, the time of action is reduced to one-half, the light intensity must be increased from I to $I^2$ in order to obtain the same action. If, therefore, by displacement of the bands, the time of action $t$ for a given intensity I is decreased, this is equivalent to a forward shifting of the dazzle stimulus into the hypoexcitable part of the relative refractory phase or an increase of the speed of rotation. Since the shortening of the time $t$ of the projection of the light means a reduction of the brightness for the co-viewer, the brightness perception can be increased by repeating this slight projection in accordance with the law $t \times \log I$=constant; in other words, the light projection of a part of the bands in front of the light source must be caused to take place a short time later, so that $t$ is doubled. To be sure, the light energy thrown out is halved, but since the logarithm of one-half the quantity of energy does not decrease as strongly, there is again obtained in this manner a greate brightness by the doubling of $t$. This principle of the production of several light beams one after the other can be multiplied in front of a light source. The only condition is that in the case of a suitable development of the bands additionally in the car's own field of view, the direct projection of light of the car's own source of light in the opening phase of the bands in the car's own field of view takes place during the direct viewing through these bands, since the user of such a device should see the light passing from his headlight onto the street through the rows of bands rotating also in front of his eyes with exactly the same brightness as though he looked past these bands onto the street. Since the light of a car coming from the opposite direction is reduced by about 80% already when the bands are in parallel position to the direction of travel, it is possible by turning the bands with respect to each other, which results in a decrease of the time of direct vision through the bands, to reduce the light coming from the other direction even more. It need only be seen to it that the successive light projections of the car's own source of light taking place during one revolution always pass, during the opening phase of the bands in the car's own field of view, in front of the eyes onto the street. This result can be achieved in various maners.

In case of the provision of several rows of bands behind each other, the bands of the central row can form a zig-zag line when the bands of the rows lying in front of and behind same are parallel to the direction of travel. In this way the result is obtained that the direct passage of the light from the headlight source of the car itself is shortened in time, as a result of which the dedazzling (deglaring), in accordance with what has been stated above, is promoted. Similarly, in case of the arrangement of several rows of bands behind one another, the bands of one row can be turned somewhat, in groups with respect to the bands of the neighboring row or rows.

With this group-wise turning of the bands, the result is obtained that the light thrown towards the side and towards the front is increased so that the time of action on the retina is lengthened, as a result of which a stronger brightness perception for the viewer is produced. However, the bands of one row can also have opposite the bands of the adjacent row or rows several stepped stages which are off-set with respect to each other, so that the edges have a helically-step-shaped development. In this way also several light projections can be produced by the bands on the road during an opening phase. In case of the simultaneous arrangement of bands in the field of view of the driver, the stepped staggered stages of the bands can be so arranged in front of the headlight or headlights that they make possible the direct emergence of the light when the bands permit direct viewing in the direct field of view of the driver. With this arrangement, therefore, the light projections of the car's own source of light take place in the opening phase, that is during the direct viewing of the bands in the field of view of the driver, so that the driver sees the road before him lit up exactly as brightly through these rotating bands as if he were to look past the bands. If, furthermore, a row of bands of the bands in the field of view of the driver is arranged at an angle with respect to an adjacent row of bands, it is possible by this staggering of the bands in front of the eyes of the driver further to reduce the incidence of light of an approaching source of light, for instance, a vehicle coming from the opposite direction.

The arrangement can furthermore be such that the bands arranged in front of the headlight or headlights have a phase shift and therefore a corresponding lead or lag with respect to the bands for the direct emergence of light lying in the field of view of the driver. If the direct light emergence from the car's own headlight is allowed to lead somewhat, a great brightness will prevail upon the opening of the bands in front of the eyes of the driver on the road as a result of which there is produced on the retina of the driver, as a result of adaptation and refractory phase, a hypoexcitability for the dazzling beam of the oncoming car entering from the side after further opening of the bands with the result of a lesser effect of this beam of light. In the case of the lagging of the bands in front of the eyes, the car's own light projection on the road must reach the retina of the driver before the dazzling beam of the oncoming car reaches it. The lead or lag of the bands arranged in front of the headlight or headlights can also be obtained by making these bands narrower than the bands lying in the field of view of the driver, or vice versa.

When three rows of bands are arranged behind each other, the bands of the rear row of bands seen in the direction of the light advantageously have such an angular position with respect to the bands in the front row of bands that the light reflected by the rear bands can be projected past the front bands, in other words, the light reflected by the rear bands will in this case first be thrown onto the front bands and then reflected by the latter onto the road. Only after the openings between the bands have become larger, due to the turning thereof seen in the direction of travel, can the rear bands throw the light past the front bands onto the road.

The simultaneous provision of bands in front of the headlight or headlights and in the field of view of the driver can be achieved in the manner that the bands extend over the region of light of the headlight or headlights and that the extending part serves entirely or partially as masking screen which opposes incident light. The said extending part of the bands may in this connection be developed in whole or in part in such a manner that the headlight can also serve as fog light.

There are various possibilities of construction for the development of the headlights in combination with the rotating bands. Thus, the arrangement can consist of a headlight which diverges the light weakly towards the front side and strongly towards the front downward, or a plurality of such headlights arranged behind a device with rotating smooth bands which reflect in the region of the headlight or headlights, these bands lying simultaneously in a non-reflecting manner in the field of view of the driver. The amount of the divergence can in this connection be obtained by the suitable nature of the surface of the bands. The apparatus can furthermore consist in the arrangement of a headlight which emits the light in parallel or practically parallel direction, this headlight being located behind a device having rotating bands which are provided within the region of the light with reflecting curvatures which, by throwing the light with a lateral and forward divergence below a plane horizontal to the road and passing through the source of light, illuminate the road in front of the vehicle, in which case these bands can be smooth and non-reflecting also in the field of view of the driver. These curvatures of the bands may consist of laterally continuous archings which may also lie over each other in the form of humps. The curvatures may furthermore be obtained by indentations in the bands which can be produced in a simple manner by milling. The presence of such curvatures or indentations affords, for instance, the advantage that in the case of the provision of several rows of bands one behind the other, the light beam intercepted by the front bands when these bands are provided with the said reflective curvatures or indentations is thrown even closer laterally on the vehicle, while the beam of light from the rear bands which emerges through the front bands strikes the road further to the side in front. By a slight angular inclination of the curvatures or indentations of the rear bands with respect to those of the front bands, the result is obtained that the light beam of the rear bands comes against the road at a greater distance in front of the vehicle alongside the central light beam. This angular inclination can be calculated from (1) the divergence of the central light beam, (2) the inclination of the axis of this light beam to the road, (3) the position of the point of intersection of the reflected light beam and the road.

The upward-directed surfaces of the curvatures or indentations are advisedly dulled on the bands so that no dazzling light can be reflected from these surfaces.

In the same way, the bands are also advisedly provided with a black dulling in the region of the field of view of the driver in order to avoid any dazzling reflections on the bands in front of the eyes of the driver. For this same purpose, the bands in the field of view of the driver can be provided with downwardly extending grooves, as is similarly done in the case of lenses of photographic apparatus, as a result of which the reflection of the light is still further reduced.

In order to increase the brief duration of the passage of light through the bands in front of the headlights, these bands can be provided with longitudinally extending slits, i.e., slits extending in downward direction.

Finally, there may be provided a stop device for the bands by means of which the bands are held firmly in light-emergence position when they are stopped. The arrangement can furthermore be such that the device is displaceable with respect to the headlight or headlights. Furthermore, the headlight or headlights and the device may be surrounded jointly or individually by a protective housing. However, the device itself can also be installed within the headlight housing.

Devices for the carrying out of the method of the present invention can therefore be so arranged in front of the headlight or headlights that by acting substractively or by acting additively on the light intensity of the headlights, they eliminate its dazzling effect.

If, for instance, two oncoming vehicles are both provided with the device, they cannot dazzle each other. As long as all vehicles are not equipped with such an antidazzle device, a subtractively acting identical device can be arranged in the car's own field of view, which, developed in accordance with the invention, eliminates the dazzling effect of oncoming headlights. Similarly, it is possible to use such devices also by themselves alone in order to remove the dazzling effect from the sources of light which, for instance, fixed in space, are directed against the viewer. The arrangement utilizing the rotating bands is suitable for both purposes, namely both for the removal of the dazzling effect from its own headlights and for the removing of the dazzling effect of other dazzling sources of light directed on the driver's own field of view, as can already be noted from what has been stated above. In this connection, the arrangement may also be such that, separately from the arrangement in front of the headlight or headlights, there is provided a device which can be placed in the field of view of the driver and protects the latter against the dazzling effect of an oncoming headlight. Such separately arranged devices are preferably operated synchronously in a manner known per se. Furthermore, the number of revolutions or swings of the device can be controlled in a manner known per se by means of a precision regulator, in which connection the place of such a precision regulator may also be taken by a braking device of known type suitable for this purpose.

In the case of the separate arrangement of devices in front of the headlights and in the driver's own field of view, there may also be used a combination of subtractively and additively acting devices. Thus, the elimination of the dazzling effect of the car's own headlights can be effected by means of successive light flashes and the removal of the dazzling effect from oncoming headlights can be effected by means of rotating bands.

When most or even all vehicles are provided with a device in accordance with the invention, such a device can, for instance, have the following appearance and operate in the following manner: In front of the eyes of the driver, for instance, behind the windshield, there is located the anti-dazzling device for the eyes of the driver, which operates in synchronism with anti-dazzling devices in front of the car's own headlights. The control or drive of the devices can be effected jointly or individually. This can be done, for instance, by means of synchronous motors. For rotating bands of the same vehicle, a speed governor must be provided for their matching. In this connection, it is immaterial whether such a governor acts on the source of current of the synchronous motors or on other drive devices. Likewise, it is immaterial whether the control is effected mechanically or electrically. The installation of a photo-electric cell may also give satisfactory results when all oncoming vehicles are equipped with the anti-dazzle device. By means of a precision regulator, or else a braking device, the number of swings or rotations of the anti-dazzling device in traffic can be so regulated that oncoming vehicles which are equipped in the same manner remove the dazzling effect from each other by a suitable adjusting and maintaining constant of the number of swings or rotations.

The embodiments shown and described are by no means exhaustive. They are merely intended to explain the essential concept of the invention. Technical details can also be solved in other suitable ways with known structural means. Various modifications are possible without going beyond the scope of the present invention.

Several embodiments of the invention are shown in the drawings, in which.

Figure 1:
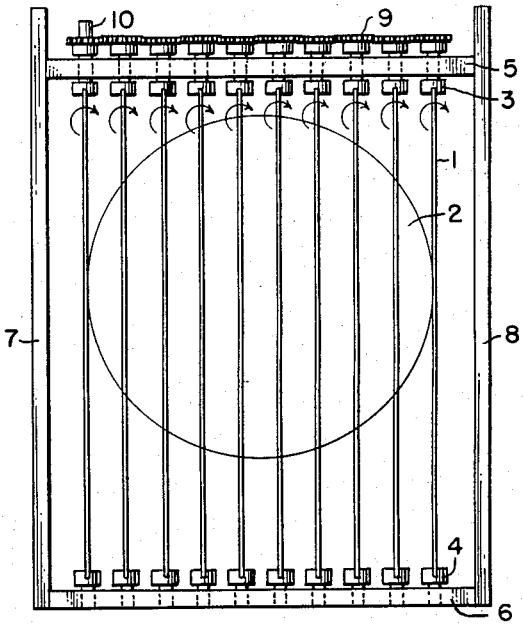
FIG. 1 is a front elevation of an anti-dazzling device arranged in front of a headlight having one row of bands.

The anti-dazzling device shown in FIG. 1 consists of a row of bands 1 arranged alongside of each other and is located in front of a headlight 2. In this case, the bands 1 of the vertically arranged anti-dazzling device are parallel to the direction of travel, so that one is looking at their front edge. The light of the headlight 2 can therefore pass through the openings between the bands. The bands 1 take up the full width of the headlight 2, in which connection the headlight 2, however, does not extend over the axes of the outer bands 1. The bands 1 have their upper and lower ends clamped in bearings 3 and 4, which turn in the transversely arranged holders 5 and 6.

The holders 5 and 6 form a closed frame with the vertical posts 7 and 8. On the ends of the upper bearings 3 extending out of the upper holder 5, there are arranged the gears 9. The gears 9 of the individual bands 1 are in engagement with each other and are driven jointly from the main drive shaft 10, to which the driving motor, not shown, may be directly connected. The main drive shaft 10 and the driving motor can be provided with a precision regulator or a brake device, or else with both these devices in order to regulate the speed of rotation or the frequency of swing of the bands 1. The anti-dazzling device extends downward beyond the headlight 2. The arrangement is such that the upper part of the strips 1 lying in front of the headlight 2, acts on the path of the beam of the headlight 2. Depending on the development of the headlight 2, this part of the bands 1 may be provided with a smooth or curved reflective surface. The lower part of the bands 1, which lies below the headlight 2, serves as anti-dazzling device to protect the driver against the dazzling light of oncoming vehicles.

Figure 2:
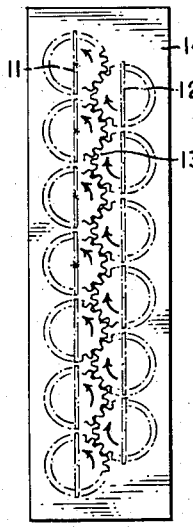
FIG. 2 is a top view of a modified form of the anti-dazzling device with two rows of bands.

In the arrangement shown in FIG. 2, two rows of bands 11 and 12, lying alongside of each other, are arranged one behind the other in such a manner that the bands 12 are located on gaps of the bands 11. In the case of this arrangement, the bands can have a substantially greater radius than the gears 13, and must all be of the same width. The device is held and supported by the frame 14.

Figure 3:
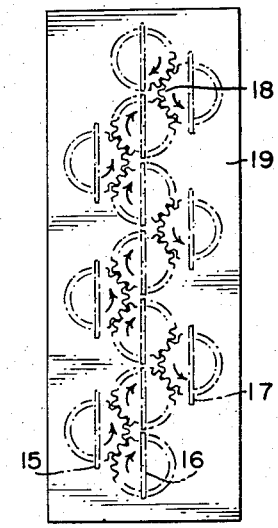
FIG. 3 is also a top view of another embodiment of an anti-dazzling device with 3 rows of bands.

In the arrangement shown in FIG. 3, three rows of bands 15, 16, and 17 are provided one behind the other, the bands 15 of the front row and the bands 17 of the rear row being located alternately on gaps of the bands 16 of the central row. This arrangement makes possible a widening of the bands 15 and 17 of the front and rear rows and thus a corresponding lengthening of the closing phase. The driving is effected via the gears 18 which are supported in the frame 19.

The bands (row of bands) in the embodiments shown in FIGS. 1–3 are arranged alongside of each other in front of the headlight. The bands are clamped at their upper and lower ends in bearings which turn in transversely arranged holders. On the ends of the upper bearings extending out of the upper holders there are arranged the gears. The gears of the individual bands are in engagement with each other and are driven jointly from the main drive shaft to which driving means as, for example, a motor is directly connected. The main drive shaft and the driving means are advantageously provided with a precision regulator or brake device, or both, in order to regulate the speed of rotation or frequency of swing of the bands. The arrangement is such that on rotation of the bands to an open position light passes through said openings, the amount of light depending on the size of the opening; that is, in the arrangement in accordance with the invention, the bands are secured at their ends and are adapted for at least partial rotation, the turning movement being carried out about the longitudinal axis of the bands. In rotation, the bands provide openings through which light can pass. When the bands are in fully open position a bright-to-dazzling light is transmitted and, when the bands are in a partially open position, a dimmer light is transmitted, and, when the bands have rotated to a completely closed position, no light whatsoever is transmitted.

The time interval elapsing between the beginning of the phase of dim light and the end of the phase of bright to dazzling light is less than the duration of the refractory phases of the eye.

Figure 4:
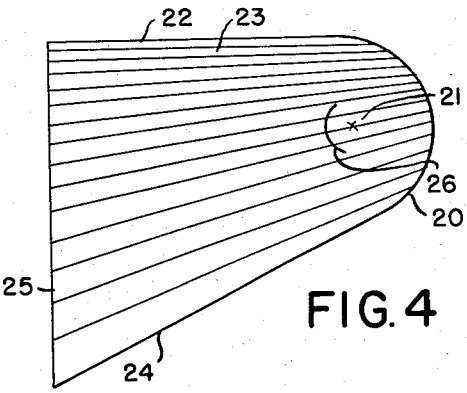
FIG. 4 shows schematically the source of the beam at a headlight in side view.

In the case of the headlight 20 of FIG. 4 which is shown merely schematically, the source of light is designated 21. This headlight has downward diverging light rays, which extend below a horizontal plane 22, through the upper edge of the headlight. The uppermost light ray 23 diverges downward with respect to same, and strikes the road, for instance, at a distance away of about 200 meters. The lowermost light ray 24 strikes the road at a distance away of about 2 meters. The smooth reflective bands 25 of the anti-dazzling device reflect the light towards the side and in this way effect the necessary lateral illumination of the road. By means of a small screen 26, direct illumination of the road from the source of light 21 is prevented.

Figure 5:
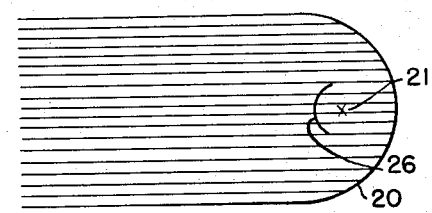
FIG. 5 is a similar schematic representation of the path of the beam at this headlight in top view.

From FIG. 5 there can clearly be noted the ray path of the headlight of FIG. 4 in top view. The source of light 21 produces via the headlight 20 parallel or slightly diverging light which diverges from the width of the headlight to a distance away of about from 200 meters to 3–4 meters.

Figure 6:
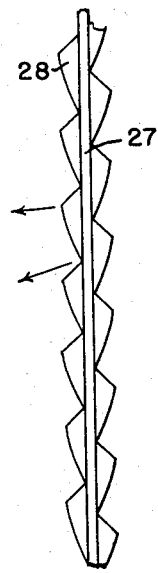
FIG. 6 is a view looking at the edge side of a band on an enlarged scale.

In FIG. 6 there is shown in elevation on an enlarged scale a view of the edge of a band 27 showing how this band can be provided on its flat sides with a number of humps 28 lying one above the other, the outer surface of which is reflective. Instead of a plurality of such humps 28, there may also be provided one continuous hump extending over the necessary length of the band.

Figure 7:
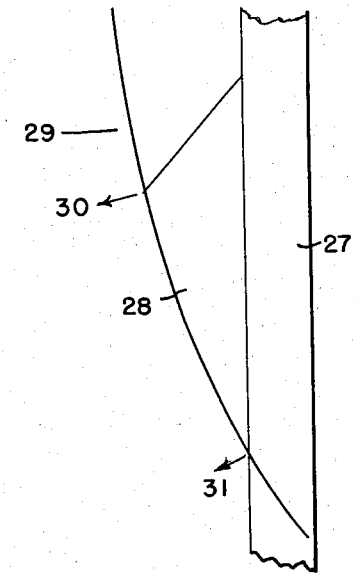
FIG. 7 is a portion of FIG. 6 on a still larger scale.

From FIG. 7 it can be seen how the light rays are reflected in the case of a hump 28 in accordance with FIG. 6. Only the lower curved part of the hump 28, which is arranged on the wide side of the band 27, is provided with a reflective surface, namely the part which lies below the horizontal plane 29 through the outer top point of the hump 28. The reflective surface is furthermore limited by the normals to the tangents at the upper apex and lower point of intersection of the hump 28. Therefore the reflection of the uppermost and lowermost light rays is determined by these normals 30 and 31.

Figure 8:
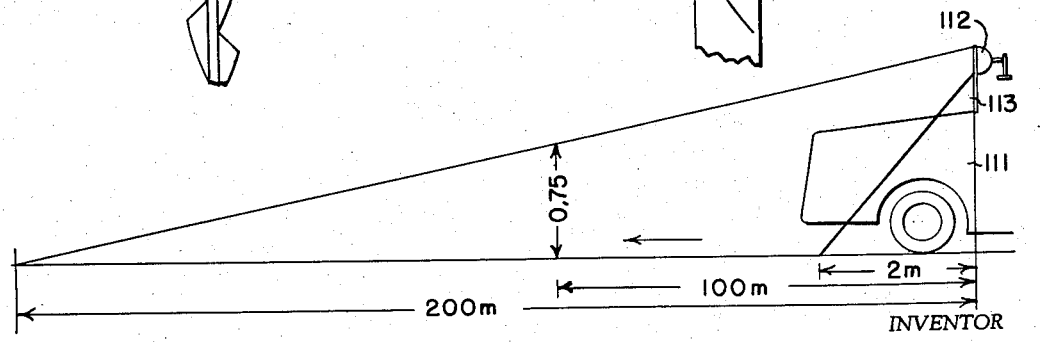
FIG. 8 shows in diagram the arrangement of a headlight with an anti-dazzling device in an automobile.

FIG. 8 shows the manner in which a headlight 112 with anti-dazzling device 113 can be mounted on a car 111 in front of its windshield and the driver. The figure shows the lower light beam which strikes the road at about 2 meters distance in front of the anti-dazzling device and also the upper light beam which intersects the road at about 200 meters distance.

I claim:

1. A method of eliminating the dazzling effect of strong light sources, which comprises producing an intermittent light of high frequency including a phase of dim light following a dark phase and a phase of bright to dazzling light following said phase of dim light in a continuously recurring sequence by interruption of a constantly emitted light beam, the time interval elapsing between the beginning of said phase of dim light and the end of said phase of bright to dazzling light being less than the duration of the refractory phases of the eye.

2. Method according to claim 1 wherein there is provided a strongly increasing transition to brightness from said phase of dim light to said phase of bright to dazzling light.

3. Method according to claim 2 wherein said intermittent light is produced by partially and completely interrupting a bright to dazzling stream of light in a continuously recurring sequence so as to produce said dark, dim and bright phases.

4. Apparatus for eliminating the dazzling effect of a strong light source comprising means for producing an intermittent light of high frequency composed of a phase of dim light following a dark phase and a phase of bright to dazzling light following said phase of dim light in a continuously recurring sequence, said means including a plurality of parallel bands arranged alongside of each other and in front of a constant light source taking up at least the major portion of the space, being secured at their ends and which rapidly rotate and are reflective in the region of said light source, the rate of said rotation being in excess of 700 revolutions per minute and means for rotating said bands the time interval elapsing between the beginning of the phase of dim light and the end of the phase of bright to dazzling light being less than the duration of the refractory phases of the eye.

5. Apparatus according to 4 wherein said bands have their upper and lower ends secured in bearings which turn in transversely arranged holders, said bands being driven jointly from a main drive shaft.

6. Apparatus according to claim 4 wherein the rate of rotation of said bands is within the range of from about 7,000 to 10,000 revolutions per minute.

7. Apparatus according to claim 6 wherein said intermittent light producing means is provided with a light absorbing surface in the vicinity of said light source whereby the reflection is reduced and the direct passage of the light promoted.

8. Apparatus for eliminating the dazzling effect of a strong light source comprising means for producing an intermittent light of high frequency composed of a phase of dim light following a dark phase and a phase of bright to dazzling light following said phase of dim light in a continuously recurring sequence, said means including a plurality of parallel bands arranged alongside of each other and in front of a constant light source taking up at least the major portion of the space, being secured at their ends and which turn only partly and are reflective in the region of said light source, the rate of said turning being in excess of 700 turns per minute and means for turning said bands the time interval elapsing between the beginning of the phase of dim light and the end of the phase of bright to dazzling light being less than the duration of the refractory phases of the eye.

9. Apparatus according to claim 4, characterized by the fact that the bands lying in a plane have their longitudinal edges overlapping.

10. Apparatus according to claim 9, characterized by the fact that bands lying in a plane are arranged at a distance from each other and that their gaps are covered by other bands staggered with respect to said first bands and also lying in a plane.

11. Apparatus according to claim 10 characterized by the fact that more than two rows of bands preferably lying in a plane are arranged one behind the other.

12. Apparatus according to claim 11, characterized by the fact that in the manner known per se the closing phase of the bands for the direct passage of light is greater than their opening phase.

13. Apparatus according to claim 4 characterized by the fact that in the case of a plurality of rows of bands arranged one behind the other each following row has a different direction of rotation than the preceding row.

14. Apparatus according to claim 13 characterized by the fact that the bands are arranged vertically.

15. Apparatus according to claim 14, characterized by the fact that in case of the arrangement of several rows of bands behind one another and the position of a part of the bands parallel to the direction of travel, the other part of the bands at the same time is rotationally staggered with respect to the former.

16. Apparatus according to claim 15, characterized by the fact that in case of the arrangement of several rows of bands behind each other, the bands of one row are somewhat rotationally staggered in groups with respect to the bands of the adjacent row or rows.

17. Apparatus according to claim 16, characterized by the fact that in case of the arrangement of several rows of bands behind one another, the bands of one row have a plurality of stages which are stepped and rotationally staggered with respect to the bands of the adjacent row or rows.

18. Apparatus according to claim 17, characterized by the fact that in case of simultaneous provision of bands in the field of view of the driver, the stepped and rotationally staggered stages of the bands are so arranged in front of the headlight or headlights that they make possible the direct emergence of light when the bands permit direct through viewing in the field of view of the driver.

19. Apparatus according to claim 18, characterized by the fact that of the bands in the field of view of the driver, the bands of one row of bands is at an angle with respect to the bands of an adjacent row of bands.

20. Apparatus according to claim 19, characterized by the fact that the bands arranged in front of the headlight or headlights have a phase shift with respect to the bands lying in the field of view of the driver for the direct light emergence and thus have a corresponding lead or lag.

21. Apparatus according to claim 20, characterized by the fact that the lead or lag of the bands arranged in front of the headlight or headlights is obtained in the manner that these bands are narrower than the bands lying in the field of view of the driver or vice versa.

22. Apparatus according to claim 21, characterized by the fact that the rear row of bands as seen in the direction of the light have such an angular position with respect to the bands in the front row of bands that the light reflected from the rear bands can be projected past the front bands.

23. Apparatus according to claim 22, characterized by the fact that the bands extend over the range of light of the headlight and the extending portion serves in whole or in part as masking screen against incident light.

24. Apparatus according to claim 23, characterized by the fact that the amount of the divergence is obtained by suitable development of the surface of the bands.

25. Apparatus according to claim 24, characterized by the provision of a headlight which sends out the light directly parallel or approximately parallel behind an arrangement with rotating bands which are provided in the region of the light with reflective curvatures which, by throwing the light out laterally and forward with respect to the row below a horizontal plane passing through the source of light, illuminate the road in front of the vehicle, these bands being smooth and not reflective also in the field of view of the driver.

26. Apparatus according to claim 25, characterized by the fact that the curvatures of the bands consist of continuous archings.

27. Apparatus according to claim 26, characterized by the fact that the curvatures of the bands consist of a row of hump-like archings located above each other.

28. Apparatus according to claim 27, characterized by the fact that the curvatures of the bands are obtained by indentations in the bands.

29. Apparatus according to claim 28, characterized by the fact that the reflective curvatures or identations are arranged in such a manner that they throw the reflecting and diverging headlight laterally and forward below the eye level of an oncoming driver.

30. Apparatus according to claim 29, characterized by the fact that the curvatures or indentations of the bands of the front series of bands as seen in the direction of the light have a stronger inclination to the road than those of the bands of the following rows of bands.

31. Apparatus according to claim 30, characterized by the fact that upward facing surfaces of the curvatures or indentations are dulled.

32. Apparatus according to claim 31, characterized by the fact that the bands are dulled black within the region of the field of view of the driver.

33. Apparatus according to claim 4, in which additional means including a plurality of said bands are arranged on an automobile in the field of view of the driver and said means are adjustable as a whole with respect to the direction of view.

(References on following page)

References Cited in the file of this patent

UNITED STATES PATENTS

| | | |
|---|---|---|
| 1,236,966 | Minetti et al. | Aug. 14, 1917 |
| 1,619,720 | Gordon | Mar. 1, 1927 |
| 1,684,720 | Wagner | Sept. 18, 1928 |
| 1,716,604 | Schuchert | June 11, 1929 |
| 1,992,188 | Chambers | Feb. 26, 1935 |
| 2,029,348 | Van Denburg | Feb. 4, 1936 |
| 2,119,370 | Van Leunen | May 31, 1938 |
| 2,539,927 | Ramminger | Jan. 30, 1951 |
| 2,647,335 | Andersson | Aug. 4, 1953 |
| 2,755,700 | Ljungstrom | July 24, 1956 |

FOREIGN PATENTS

| | | |
|---|---|---|
| 308,148 | Italy | Mar. 27, 1933 |
| 693,097 | Great Britain | June 24, 1953 |
| 996,214 | France | Aug. 29, 1951 |
| 1,030,819 | France | Mar. 18, 1953 |